(12) United States Patent
Balappanavar et al.

(10) Patent No.: US 10,455,540 B2
(45) Date of Patent: Oct. 22, 2019

(54) TECHNOLOGIES FOR PREDICTIVE ALIGNMENT OF ANTENNA ARRAY OF A VEHICLE

(71) Applicant: Intel IP Corporation, Santa Clara, CA (US)

(72) Inventors: Subhas Balappanavar, Portland, OR (US); Sreenivas Kasturi, Hillsboro, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/018,677

(22) Filed: Jun. 26, 2018

(65) Prior Publication Data

US 2019/0053191 A1 Feb. 14, 2019

(51) Int. Cl.
| | |
|---|---|
| *H04W 4/44* | (2018.01) |
| *H04W 48/20* | (2009.01) |
| *H04W 64/00* | (2009.01) |
| *H04W 4/38* | (2018.01) |
| *H01Q 1/12* | (2006.01) |
| *H01Q 1/32* | (2006.01) |
| *H04W 16/28* | (2009.01) |
| *H01Q 3/26* | (2006.01) |
| *H01Q 3/02* | (2006.01) |
| *H01Q 3/24* | (2006.01) |
| *H01Q 3/30* | (2006.01) |

(52) U.S. Cl.
CPC ........ *H04W 64/006* (2013.01); *H01Q 1/1257* (2013.01); *H01Q 1/3233* (2013.01); *H01Q 3/2605* (2013.01); *H04W 4/38* (2018.02); *H04W 4/44* (2018.02); *H04W 16/28* (2013.01); *H01Q 1/3275* (2013.01); *H01Q 3/02* (2013.01); *H01Q 3/24* (2013.01); *H01Q 3/30* (2013.01); *H04W 48/20* (2013.01)

(58) Field of Classification Search
CPC ....... H04W 64/006; H04W 4/38; H04W 4/44; H04W 16/28; H04W 48/20; H04W 64/00; H01Q 1/1257; H01Q 1/3233; H01Q 3/02; H01Q 3/28; H01Q 3/34; G01S 3/32; G01S 5/02

See application file for complete search history.

(56) References Cited

U.S. PATENT DOCUMENTS

| | | | |
|---|---|---|---|
| 6,564,057 B1* | 5/2003 | Chun | H04W 36/32 455/437 |
| 2002/0115452 A1* | 8/2002 | Whikehart | H04W 64/00 455/456.5 |
| 2012/0056784 A1* | 3/2012 | Xie | H01Q 1/125 342/359 |
| 2017/0059688 A1* | 3/2017 | Gan | G01S 3/325 |

* cited by examiner

*Primary Examiner* — Dong-Chang Shiue
(74) *Attorney, Agent, or Firm* — Barnes & Thornburg LLP

(57) ABSTRACT

Technologies for aligning an antenna array of a vehicle by a compute device are disclosed. A compute device may control an antenna array to connect to a base station. The compute device may determine one or more movement parameters of the vehicle, such as an indication that the vehicle is going to take a U-turn. The compute device may then control the antenna array to track the base station during the U-turn by physically rotating the antenna array.

25 Claims, 6 Drawing Sheets

TECHNOLOGIES FOR PREDICTIVE ALIGNMENT OF ANTENNA ARRAY OF A VEHICLE

BACKGROUND

Mobile devices consume data at a continually-increasing rate. The bandwidth available at lower frequencies is inherently limited by certain factors such as the carrier frequency. To meet the expected growth in demand for bandwidth, other options can be considered, such as using higher-frequency signals and/or using phased arrays of antennae to generate a directional beam.

Using a directional beam can have several advantages. For example, use of a directional beam can be more power efficient, allowing lower energy usage at the source and a higher signal strength at the receiver. Directional beams may also allow for multiple devices communicating in the same area on the same band at the same time. However, unlike for signals sent in all directions, a directional beam must be controlled during movement of a device to compensate for the movement of the device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
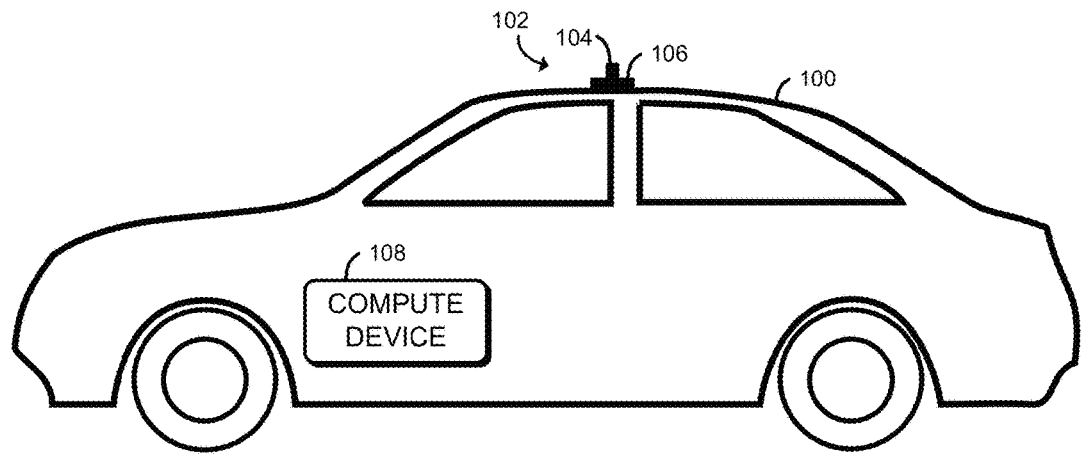
FIG. 1 is a simplified block diagram of a vehicle with an antenna system and compute device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative vehicle 100 includes an antenna system 102, which includes an antenna array 104 and an antenna base 106. The antenna base 106 may change the orientation of the antenna array 104 to control the direction the antenna array 104 is pointing. The vehicle 100 further includes a compute device 108. In use, the compute device 108 determines information relating to the path of the vehicle 100, such as Global Positioning System (GPS) coordinates and navigation data. The compute device 108 may control the antenna system 102 by controlling the orientation of the antenna array 104 to remain pointed towards a base station to which the compute device 108 is connected through the antenna array 104. For example, in the illustrative embodiment, the compute device 108 may predict that the vehicle 100 is going to make or is making a sharp turn, such as a 90° turn or a 180° U-turn. During that turn, the compute device 108 may maintain the orientation of the antenna array 104 to point towards the connected base station. The vehicle 100 may use the connection to the base station to facilitate communications, such as cellular and/or data communications.

The vehicle 100 may be any suitable vehicle that may have an antenna system 102 and a compute device 108. In some embodiments, the vehicle 100 may be a completely or partially autonomous vehicle, such as one that is able to execute sharp turns without manual control by a driver.

The antenna array 104 may be embodied as any type of antenna array configured to receive an electromagnetic signal. In the illustrative embodiment, the antenna array 104 is a phased array of multiple independent antennae that can each output the same or substantially similar signals with a different phase that may be controllable by the compute device 108 or other component. Such a phased array allows the compute device 108 or other component to perform beam forming (or beam steering), which allows for controlling the direction of a beam of an electromagnetic wave created by the antenna array 104 in the azimuthal, elevation, and/or tilt directions. In this way, the antenna array 104 is coupled to an electromagnetic mode of a beam that propagates from the antenna array 104 to the target base station. It should be appreciated that a similar phased approach to receiving electromagnetic signals may similarly couple the antenna array 104 to an electromagnetic mode of a beam that propagates from a base station to the antenna array 104 and allow for directivity in reception of a signal. The electromagnetic modes that propagate between the antenna array 104 and the base station may propagate through a direct line of sight through air or other transparent material and/or with one or more reflections. The antenna array 104 may include any number of antennae, such as any number from 1-256 antennae. The illustrative antenna array 104 is configured to generate millimeter wave signals at a frequency of 24-86 gigahertz (GHz). The millimeter wave signals may be compatible with $5^{th}$-Generation Wireless Systems (5G). Additionally or alternatively, the antenna array 104 may be compatible with a difference frequency range, such as any frequency range from 1 megahertz (MHz) to 100 GHz. In some embodiments, the antenna array 104 may include multiple sets of antennae, each with a particular range of beam forming. For example, the antenna array 104 may include one set of antennae with a beam forming range of 0–10°, a second set of antennae with a beam forming range of 10–20°, etc. The antenna array 104 may include any number of sets of antennae with a particular range of beam forming, such as 1-10 sets. In some embodiments, different sets of antennae may be able to direct or receive a beam from different base stations at the same time and/or a single set of antennae may be able to direct or receive a beam from different base stations at the same time.

The illustrative antenna base 106 is able to change the orientation of the antenna array 104 in the azimuthal, elevation, and/or tilt directions. The antenna base 106 may be able to control the orientation of the antenna array 104 in any suitable manner, such as a rotation stage, a gimbal, etc. In some embodiments, the antenna base 106 may include one or more components that perform some aspect of signal processing, such as shifting the frequency of signals between the signal to/from a base station and the signal from/to the compute device 108.

Figure 2:
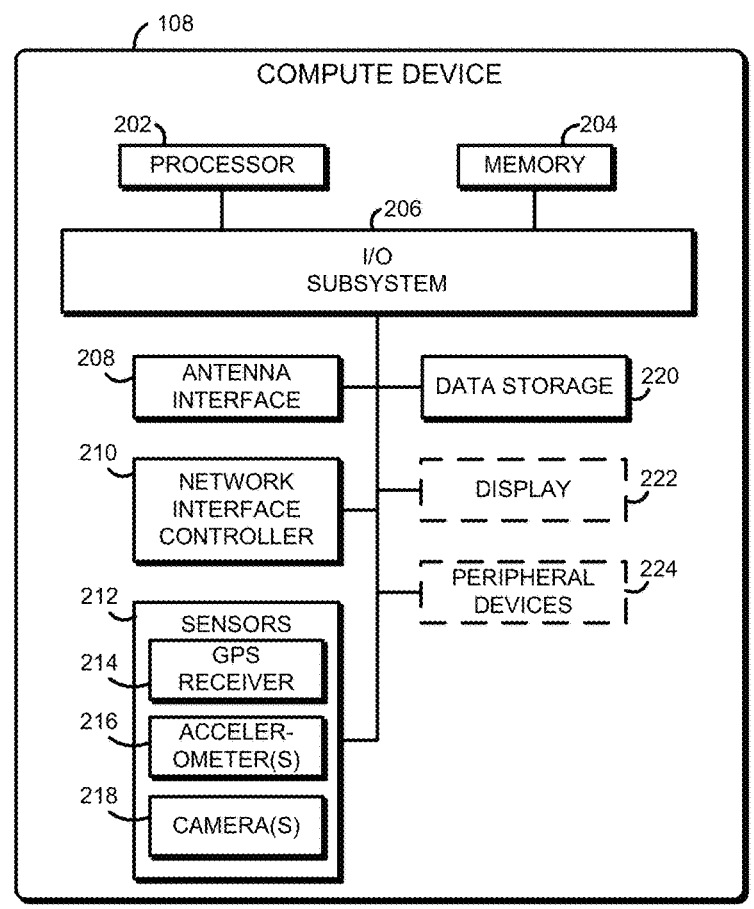
FIG. 2 is a simplified block diagram of at least one embodiment of the compute device of FIG. 1.

Referring now to FIG. 2, the compute device 108 may be embodied as any type of compute device capable of controlling alignment of the antenna array 104 and performing the functions described herein. For example, the compute device 108 may be embodied as or otherwise be included in, without limitation, an embedded computing system, a server computer, a System-on-a-Chip (SoC), a multiprocessor system, a processor-based system, a consumer electronic device, a smartphone, a cellular phone, a desktop computer, a tablet computer, a notebook computer, a laptop computer, a network device, a networked computer, a wearable computer, a handset, a messaging device, a camera device, and/or any other computing device. The illustrative compute device 108 includes the processor 202, a memory 204, an input/output (I/O) subsystem 206, an antenna interface 208, a network interface controller 210, sensors 212 (including a GPS receiver 214, one or more accelerometers 216, an one or more cameras 218, and data storage 220. In some embodiments, one or more of the illustrative components of the compute device 108 may be incorporated in, or otherwise form a portion of, another component. For example, the memory 204, or portions thereof, may be incorporated in the processor 202 in some embodiments. In some embodiments, the antenna array 104 and/or the antenna base 106 or portions thereof may form a part of or otherwise be incorporated into the compute device 108. For example, the compute device 108 may be embodied as a smartphone with an embedded antenna array 104 capable of communicating with millimeter waves.

The processor 202 may be embodied as any type of processor capable of performing the functions described herein. For example, the processor 202 may be embodied as a single or multi-core processor(s), a single or multi-socket processor, a digital signal processor, a graphics processor, a microcontroller, or other processor or processing/controlling circuit. Similarly, the memory 204 may be embodied as any type of volatile or non-volatile memory or data storage capable of performing the functions described herein. In operation, the memory 204 may store various data and software used during operation of the compute device 108 such as operating systems, applications, programs, libraries, and drivers. The memory 204 is communicatively coupled to the processor 202 via the I/O subsystem 206, which may be embodied as circuitry and/or components to facilitate input/output operations with the processor 202, the memory 204, and other components of the compute device 108. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 206 may form a portion of a system-on-a-chip (SoC) and be incorporated, along with the processor 202, the memory 204, and other components of the compute device 108 on a single integrated circuit chip.

The antenna interface 208 may embodied as any type of device, circuit, or interconnect that is configured to connect the antenna array 104 and/or the antenna base 106 to the compute device 108. In the illustrative embodiment, the antenna interface 208 is configured to carry signals by one or more wires from the compute device 108 to the antenna array 104 and the antenna base 106 that control the orientation of the antenna array 104, including the physical orientation of the antenna array 104 as well as the orientation of the beam via beam forming (i.e., by controlling the phases of the individual antennae of the antenna array 104). The illustrative antenna interface 208 also carries the signal sent by and/or received by the antenna array 104. The signal carried by the antenna interface 208 may be processed in some way before it is sent by the antenna array 104 to a base station or after it is received by the antenna array 104 from a base station. For example, the compute device 108 may send a signal with a bandwidth from 0-1 GHz to the antenna array 104 through the antenna interface 208, and the antenna system 102 may shift the signal to a bandwidth of 50-51 GHz before transmitting the shifted signal on the antenna array 104.

The network interface controller 210 may be embodied as any type of interface capable of interfacing the compute device 108 with other compute devices, such as over the antenna array 104. Additionally or alternatively, in some embodiments, the network interface controller 210 may be capable of interfacing with any appropriate cable type, such as an electrical cable or an optical cable. The network interface controller 210 may be configured to use any one or more communication technology and associated protocols (e.g., Ethernet, Bluetooth®, Wi-Fi®, WiMAX, near field communication (NFC), etc.). The network interface controller 210 may be located on silicon separate from the processor 202, or the network interface controller 210 may be included in a multi-chip package with the processor 202, or even on the same die as the processor 202. The network interface controller 210 may be embodied as one or more add-in-boards, daughtercards, network interface cards, controller chips, chipsets, specialized components such as a field programmable gate array (FPGA) or application specific integrated circuit (ASIC), or other devices that may be used by the compute device 108 to connect with another compute device. In some embodiments, network interface controller 210 may be embodied as part of a system-on-a-chip (SoC) that includes one or more processors, or included on a multichip package that also contains one or more processors. In some embodiments, the network interface controller 210 may include a local processor (not shown) and/or a local memory (not shown) that are both local to the network interface controller 210. In such embodiments, the local processor of the network interface controller 210 may be capable of performing one or more of the functions of the processor 202 described herein. Additionally or alternatively, in such embodiments, the local memory of the network interface controller 210 may be integrated into one or more components of the compute device 108 at the board level, socket level, chip level, and/or other levels.

The sensors 212 may be embodied as any one or more sensors capable of generating an input signal that is indicative of movement of the compute device 108 and/or the vehicle 100. In the illustrative embodiment, the sensors 212 include a GPS receiver 214, one or more accelerometers 216, and one or more cameras 218. The one or more accelerometers 216 may detect linear and/or angular acceleration in each of three linear and/or angular dimensions. Additional sensors 212 detect operating conditions of the vehicle 100, such as an amount of acceleration, an amount of breaking, an orientation of the steering wheel, use of a turn signal of the vehicle 100, etc.

The data storage 220 may be embodied as any type of device or devices configured for the short-term or long-term storage of data. For example, the data storage 220 may include any one or more memory devices and circuits, memory cards, hard disk drives, solid-state drives, or other data storage devices.

In some embodiments, the compute device 108 may include other or additional components, such as those commonly found in a compute device. For example, the compute device 108 may also have a display 222 and/or peripheral devices 224. The peripheral devices 224 may include a keyboard, a mouse, etc. The display 222 may be embodied as any type of display on which information may be displayed to a user of the compute device 108, such as a touchscreen display, a liquid crystal display (LCD), a light emitting diode (LED) display, a cathode ray tube (CRT) display, a plasma display, an image projector (e.g., 2D or 3D), a laser projector, a heads-up display, and/or other display technology.

Figure 3:
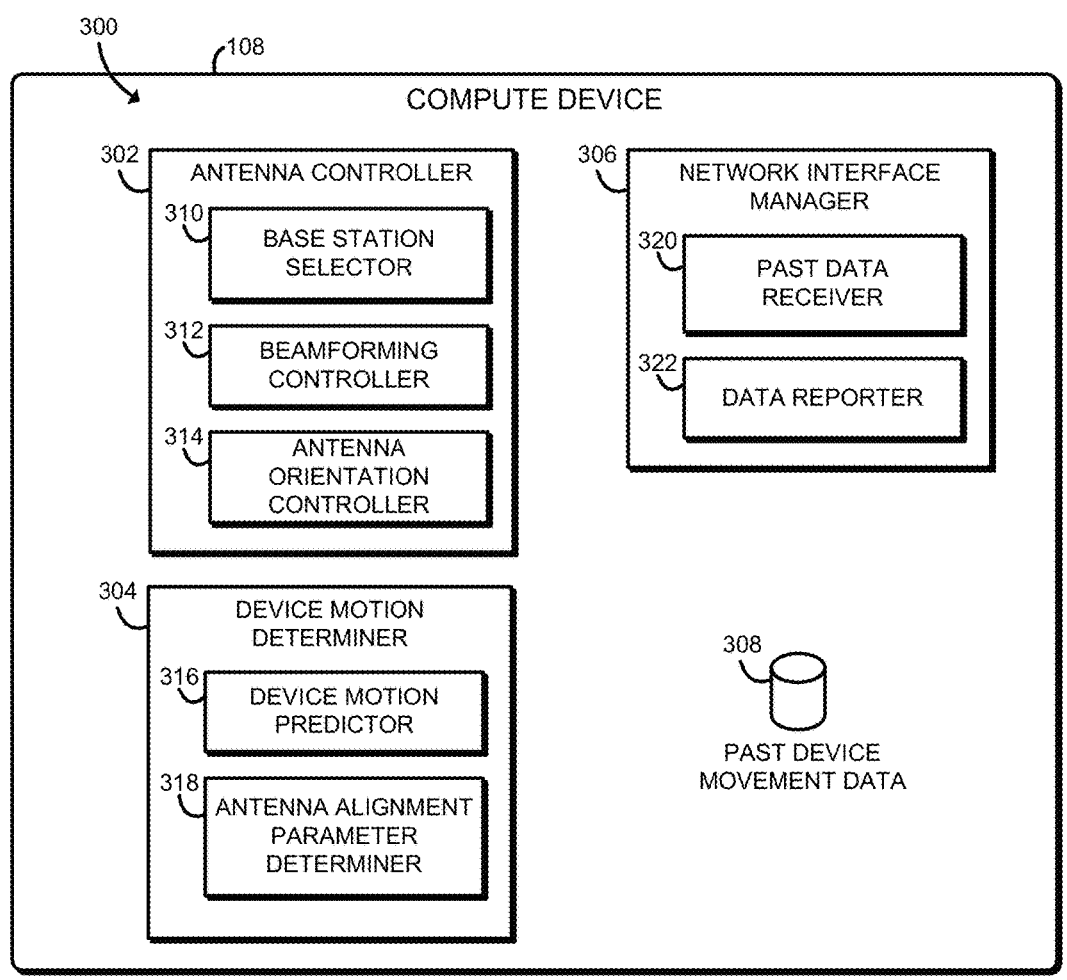
FIG. 3 is a block diagram of at least one embodiment of an environment that may be established by the compute device of FIG. 2.

Referring now to FIG. 3, in an illustrative embodiment, the compute device 108 establishes an environment 300 during operation. The illustrative environment 300 includes an antenna controller 302, device motion determiner 304, network interface manager 306, and past device movement data 308. The various components of the environment 300 may be embodied as hardware, software, firmware, or a combination thereof. For example, the various components of the environment 300 may form a portion of, or otherwise be established by, the processor 202 or other hardware components of the compute device 108 such as the network interface controller 210. As such, in some embodiments, one or more of the components of the environment 300 may be embodied as circuitry or collection of electrical devices (e.g., antenna controller circuitry 302, device motion determiner circuitry 304, etc.). It should be appreciated that, in such embodiments, one or more of the circuits (e.g., the antenna controller circuitry 302, the device motion determiner circuitry 304, etc.) may form a portion of one or more of the processor 202, the memory 204, the I/O subsystem 206, the network interface controller 210, the data storage 220, an application specific integrated circuit (ASIC), a programmable circuit such as a field-programmable gate array (FPGA), and/or other components of the compute device 108. For example, the device motion determiner circuitry 304 may be embodied as the processor 202 and associated instructions stored on the data storage 220 and/or the memory 204, which may be executed by the processor 202. Additionally, in some embodiments, one or more of the illustrative components may form a portion of another component and/or one or more of the illustrative components may be independent of one another. Further, in some embodiments, one or more of the components of the environment 300 may be embodied as virtualized hardware components or emulated architecture, which may be established and maintained by the processor 202 or other components of the compute device 108. It should be appreciated that some of the functionality of one or more of the components of the environment 300 may require a hardware implementation, in which case embodiments of components which implement such functionality will be embodied at least partially as hardware.

The antenna controller 302, which may be embodied as hardware, firmware, software, virtualized hardware, emulated architecture, and/or a combination thereof as discussed above, is configured to control the antenna array 104. When the antenna controller 302 is to connect to a remote base station, the base station selector 310 is configured to select a target base station. To do so, the antenna controller 302 may acquire a list of nearby base stations, such as by looking up nearby base stations in a local or remote database, receiving a list of nearby base stations from another compute device (including from a base station), receiving a broadcast from nearby base stations announcing their presence, scanning for the presence of nearby base stations by beam forming, etc. The antenna controller 302 may define a desired threshold signal strength and connect to a base station with a signal strength that is at least the threshold value. The threshold may be predefined or may be determined based on various factors such as current or future bandwidth usage. In some embodiments, the antenna controller 302 may determine a signal strength by performing beamforming across a range of angles to determine how the signal strength varies across those angles. If no base station has a high enough signal strength, the antenna controller 302 may select the base station with the highest signal strength, may redefine the threshold to be lower, or take some other action. For the base stations with a high enough signal strength, the antenna controller 302 may determine how long a connection to that base station can be maintained. The duration of the connection may be predicted based on any suitable factor, such as the current, expected, or predicted path of the vehicle 100, which may be determined by the device motion determiner 304, discussed in more detail below. For example, if the vehicle 100 is going to move to a position where the line of sight to the antenna array 104 is blocked by a building in a short amount of time, the antenna controller 302 may select a base station that will be in a direct line of sight for a longer duration of time, even if that base station has a lower signal strength. The antenna controller 302 may determine whether or not there will be line of sight at a given position based on past device movement data 308, a coverage map received from another compute device (which would include which specific base stations are available in specific locations), or may be determined, such as by image processing of an image captured by the cameras 218 that indicate that an upcoming obstacle will block a line of sight to a base station.

The beamforming controller 312 is configured to control the antenna array 104 to form a beam that is directed in a particular direction. The beamforming controller 312 may control the phases of individual antennae of the antenna array 104. As discussed above, the antenna array 104 may include multiple sets of antennae, each with a particular range of beam forming. The beamforming controller 312 may select the set of antennae that can generate a beam at the desired direction.

The antenna orientation controller 314 is configured to control the orientation of the beam that is formed by the beamforming controller 312 at the antenna array 104. The antenna orientation controller 314 may control the orientation of the beam by controlling the beamforming of the beamforming controller 312 or by physically rotating the antenna array 104. The antenna orientation controller 314 may control the physical orientation of the antenna array 104 in the azimuthal, elevation, and/or tilt directions. In some embodiments, the antenna orientation controller 314 may be able to track the target base station using beamforming, such as by locating the relative position of the target base station by sweeping or scanning the beam across a range of directions and directing the formed beam to the current direction of the target base station. However, it should be appreciated that, in some circumstances, tracking the target base station in this manner may not be fast enough to compensate for a large turn in a short amount of time such as a U-turn. For such a turn, the antenna orientation controller 314 may rely on the predicted or measured movement of the compute device 108 and/or the vehicle 100 and compensate by a corresponding shift in the beamforming or the physical change in the orientation of the antenna array 104.

The device motion determiner 304, which may be embodied as hardware, firmware, software, virtualized hardware, emulated architecture, and/or a combination thereof as discussed above, is configured to determine a motion of the compute device 108 and/or the vehicle 100 and generate one or more movement parameters indicative of a past, present, or future movement of the compute device 108 and/or the vehicle 100. For example, the one or more movement parameters may indicate that the compute device 108 and/or the vehicle recently has or will soon perform a turn, such as a turn of greater than 10-90°. The one or more parameters may also indicate that the turn will happen at a certain turning radius or angular velocity, such as a turning radius of less than 5-50 feet or an angular velocity of more than 10-180° per second. The device motion determiner 304 may determine a motion of the compute device 108 and/or the vehicle 100 in any suitable manner, such as using GPS data, accelerometer data, information related to current navigation such as turn-by-turn directions, and information relating to an operating condition of the vehicle, such as velocity, position of the steering wheel, state of a turn signal, etc. In some embodiments, the device motion determiner 304 may employ image processing to determine a past, present, or future movement of the compute device 108 and/or the vehicle 100. For example, the device motion determiner 304 may perform image processing on an image taken from a camera 218 of the vehicle 100 to determine that the vehicle 100 is in a turn lane and will be turning soon. In some embodiments, the vehicle 100 may be fully or partially autonomous, and the device motion determiner 304 may determine a motion of the compute device 108 and/or the vehicle 100 based on anticipated or planned future action of the autonomous vehicle 100 communicated to the compute device 108. Additionally or alternatively, the compute device 108 may receive or otherwise acquire information indicating movement that other compute devices 108 and/or other vehicles 100 have done in the past. For example, if recent vehicles 100 on a similar path as the vehicle 100 have taken a particular detour, such an indication could indicate to the device motion determiner 304 that the vehicle 100 will take the detour. In some embodiments, the device motion predictor 316 of the device motion determiner 304 will generate one or more movement parameters indicative of a future expected movement of the compute device 108 and/or the vehicle 100.

The antenna alignment parameter determiner 318 is configured to determine one or more antenna alignment parameters based on the one or more movement parameters. The one or more antenna alignment parameters may indicate any factor related to alignment of the antenna array 104 to the target base station, such as an absolute orientation of the target base station relative to the compute device 108 and/or the vehicle 100, a relative orientation of the target base station relative to the compute device 108 and/or the vehicle 100, a desired angular velocity of the antenna array 104, etc.

The network interface manager 306, which may be embodied as hardware, firmware, software, virtualized hardware, emulated architecture, and/or a combination thereof as discussed above, is configured to interface with a network, other compute device, or other component. In the illustrative embodiment, the network interface manager 306 is configured to connect to a remote base station through the antenna array 104. The remote base station may be any suitable subsystem, such as a gNodeB in a 5G system. The network interface manager 306 may be configured to determine when and whether to connect to a base station, such as when a connection to previous base station is lost (e.g., through a radio link failure) or when a connection to the current base station will be lost soon (e.g., when the signal is very weak).

The network interface manager 306 includes past data receiver 320, which is configured to receive past data, such as past data related to movement of other compute devices 108 and/or other vehicles 100 and past data related to connections to base stations of those compute devices 108 and vehicles 100. For example, the past data may include information related to what locations have an available line of sight to what base stations (including a line of sight through one or more reflections). The past data may include past movement parameters, such as navigation information, GPS data, sensor data, etc. The past data may also include what detours, unexpected turns, etc., other compute devices 108 and/or vehicles 100 have made in the past. The past data may include antenna alignment parameters, such as how to orient the antenna array 104 to reach a particular base station from a particular location, and reflection locations that provide an indirect line of sight to a base station. In some embodiments, the past data may be stored at each of one or more base stations and the network interface manager 306 is configured to communicate with each of the one or more base stations to receive the past data.

The network interface manager 306 includes data reporter 322, which is configured to upload data related to movement of the compute device 108 and/or vehicle 100 and connectivity to one or more base stations. For example, the data reporter 322 may report what locations of the compute device 108 and/or vehicle 100 had an available line of sight to what base stations. The data reporter 322 may also report data such as a particular path a vehicle 100 took, sensor data such as GPS data or accelerometer data, etc.

The past device movement data 308 includes data related to the past movement of the compute device 108 and/or the vehicle 100 as well as data related to the past movement of other compute devices 108 and/or other vehicles 100. The past device movement data 308 may include any data related to movement of a compute device 108 and/or a vehicle 100 and connectivity to one or more base stations. For example, the past device movement data 308 may include what locations of a compute device 108 and/or a vehicle 100 had an available line of sight to what base stations, a particular path a vehicle 100 took, sensor data such as GPS data or accelerometer data, what detours or unexpected turns vehicles 100 have taken, antenna alignment parameters, such as how to orient the antenna array 104 to reach a particular base station from a particular location, and reflection locations that provide an indirect line of sight to a base station.

Figure 4:
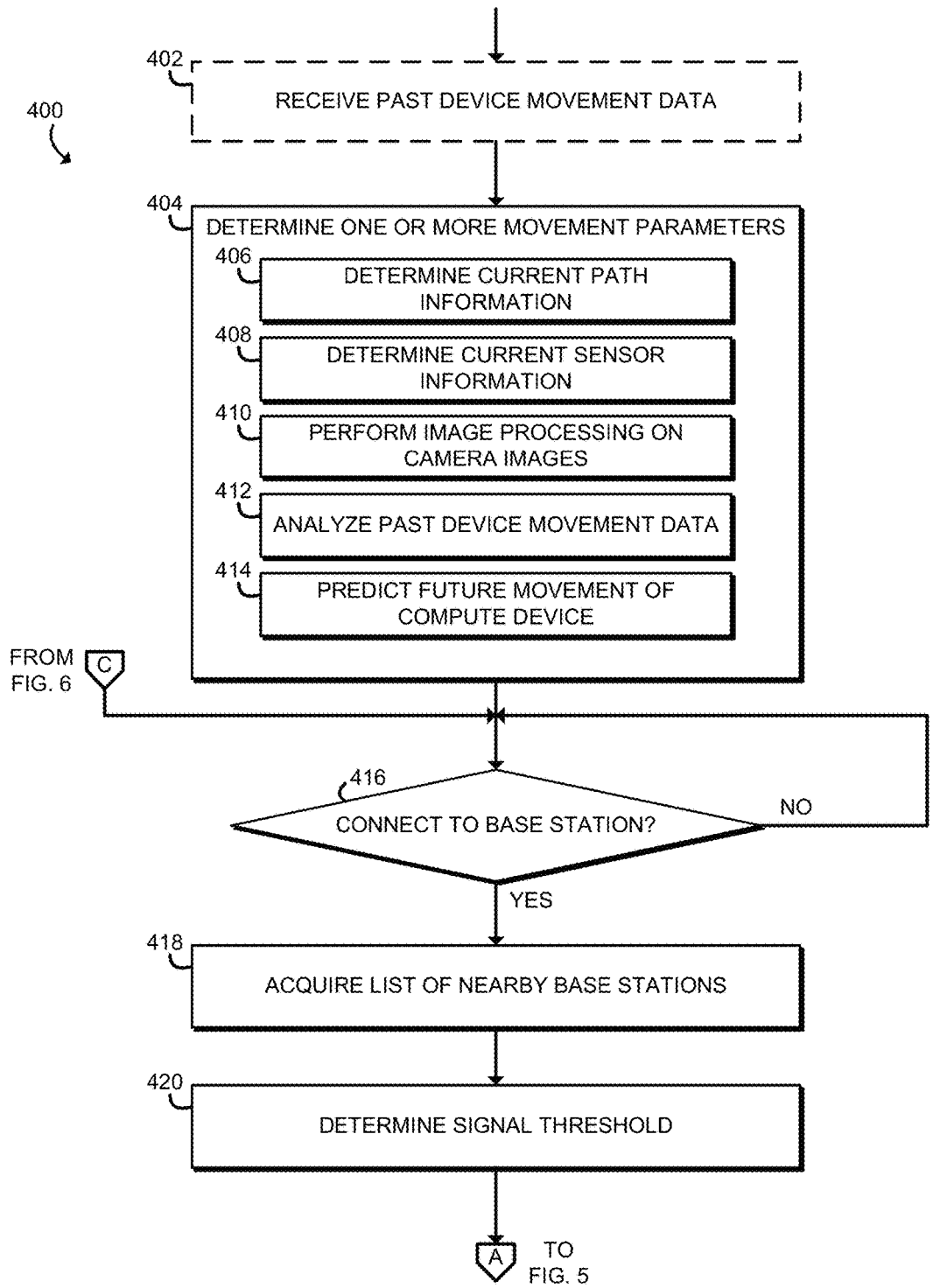
FIGS. 4-6 are a simplified flow diagram of at least one embodiment of a method for alignment of an antenna array of the vehicle of FIG. 1 that may be executed by the compute device of FIG. 2.

Referring now to FIG. 4, in use, the compute device 108 may execute a method 400 for alignment of an antenna array 104 of a vehicle 100. The method 400 begins in block 402, in which, in some embodiments, the compute device 108 may receive past device movement data. The past device movement data may include data related to the past movement of the compute device 108 and/or the vehicle 100 as well as data related to the past movement of other compute devices 108 and/or other vehicles 100. The past device movement data 308 may include any data related to movement of a compute device 108 and/or a vehicle 100 and connectivity to one or more base stations. For example, the past device movement data 308 may include what locations of a compute device 108 and/or a vehicle 100 had an available line of sight to what base stations, a particular path a vehicle 100 took, sensor data such as GPS data or accelerometer data, what detours or unexpected turns vehicles 100 have taken, antenna alignment parameters, such as how to orient the antenna array 104 to reach a particular base station from a particular location, and reflection locations that provide an indirect line of sight to a base station.

In block 404, the compute device 108 determines one or more movement parameters of the vehicle 100. The movement parameters may be indicative of a past, present, or future movement of the compute device 108 and/or the vehicle 100. For example, the one or more movement parameters may indicate that the compute device 108 and/or the vehicle recently has or will soon perform a turn, such as a turn of greater than 10-90°. The one or more parameters may also indicate that the turn will happen at a certain turning radius or angular velocity, such as a turning radius of less than 5-50 feet or an angular velocity of more than 10-180° per second. The compute device 108 may determine movement parameters in any suitable manner. For example, in block 406, the compute device 108 may determine current path information, such as using information related to current navigation such as turn-by-turn directions, and information relating to an operating condition of the vehicle, such as velocity, position of the steering wheel, state of a turn signal, etc. In block 408, the compute device 108 may determine GPS data, accelerometer data, or other sensor data and use that data to determine movement parameters. In block 410, the compute device 108 may employ image processing to determine a past, present, or future movement of the compute device 108 and/or the vehicle 100. For example, the compute device 108 may perform image processing on an image taken from a camera 218 of the vehicle 100 to determine that the vehicle 100 is in a turn lane and will be turning soon. In some embodiments, the vehicle 100 may be fully or partially autonomous, and the compute device 108 may determine a motion of the compute device 108 and/or the vehicle 100 based on anticipated or planned future action of the autonomous vehicle 100 communicated to the compute device 108. Additionally or alternatively, in block 412, the compute device 108 may receive or otherwise acquire information indicating movement that other compute devices 108 and/or other vehicles 100 have done in the past. For example, if recent vehicles 100 on a similar path as the vehicle 100 have taken a particular detour, such an indication could indicate to computer device 108 that the vehicle 100 will take the detour. In some embodiments, in block 414, compute device 108 may determine an expected or anticipated future movement of the compute device 108 and/or the vehicle 100, which may be used to determine the one or more movement parameters.

In block 416, the compute device 108 determines whether to connect a base station. The compute device 108 determine to connect to a base station based on any suitable criteria, such as when a connection to previous base station is lost (e.g., through a radio link failure) or when a connection to the current base station will be lost soon (e.g., when the signal is very weak or the current base station will be out of line of sight soon). If the compute device 108 is not to connect to a base station, the method 400 loops back to block 416 to again check if the compute device 108 is to connect to a base station. If the compute device 108 is to connect to a base station, the method 400 proceeds to block 418, in which the compute device 108 acquires a list of nearby base stations.

The compute device 108 may acquire a list of nearby base stations from any source, such as by looking up nearby base stations in a local or remote database, receiving a list of nearby base stations from another compute device (including from a base station), receiving a broadcast from nearby base stations announcing their presence, scanning for the presence of nearby base stations by beam forming, etc.

In block 420, the compute device 108 may define a desired threshold signal strength. The threshold may be predefined or may be determined based on various factors such as current or future bandwidth usage.

Figure 5:
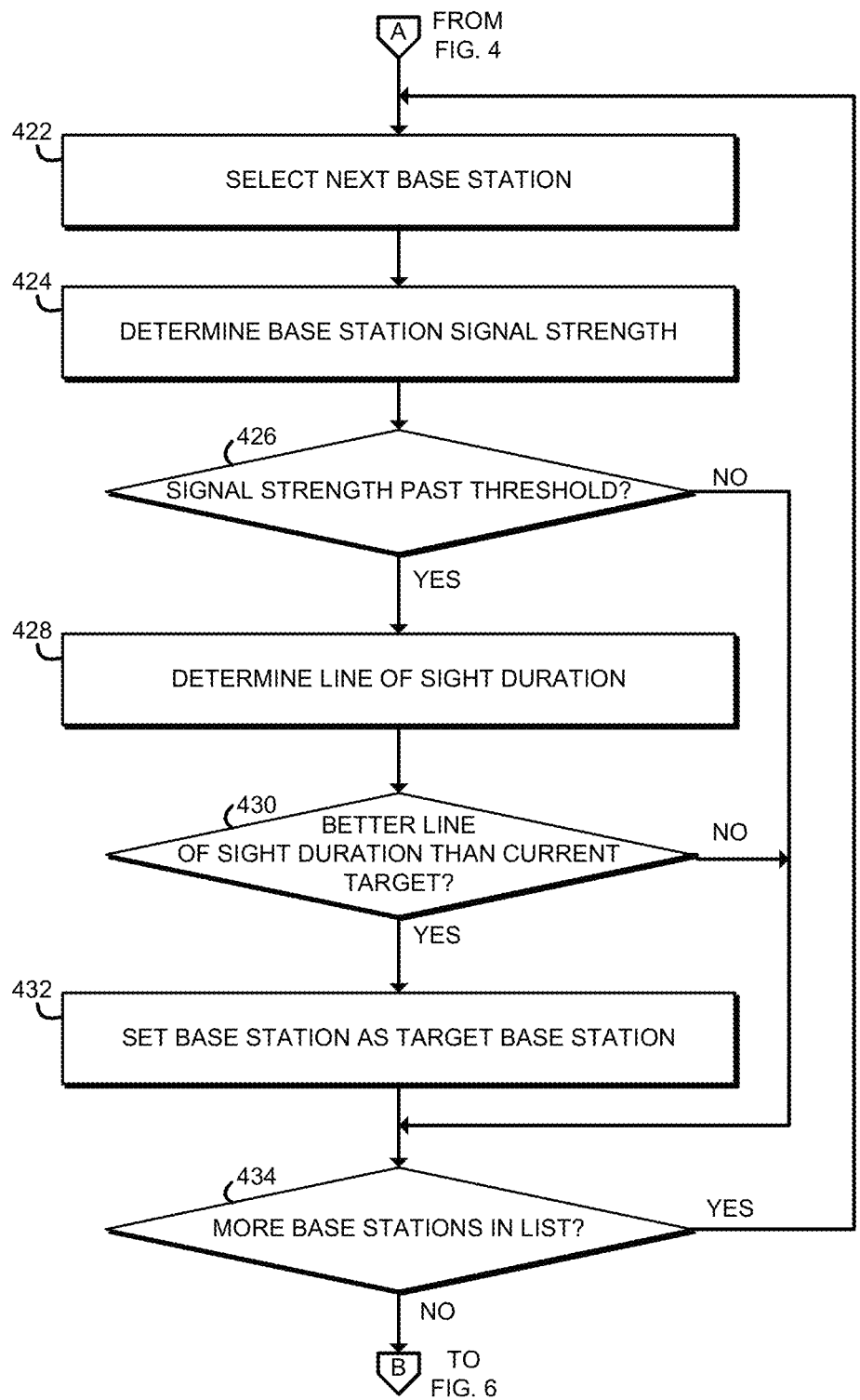

Referring now to FIG. 5, in block 422, the compute device 108 selects the next base station from the list of base stations (i.e., the first base station for the first time a base station from the list is selected). In block 424, the compute device 108 determines a signal strength for a connection to the selected base station. In some embodiments, the compute device 108 may determine a signal strength by performing beamforming across a range of angles to determine how the signal strength varies across those angles.

In block 426, if the signal strength is not past the threshold, the method 400 proceeds to block 434, in which the compute device 108 checks if there are any base stations left in the list. If the signal strength is past the threshold, the method 400 proceeds to block 428, in which the compute device 108 determines an expected or predicted duration of the line of sight to the base station. The duration of the connection may be predicted based on any suitable factor, such as the current, expected, or predicted path of the vehicle 100. For example, if the vehicle 100 is going to move to a position where the line of sight to the antenna array 104 is blocked by a building in a short amount of time, the compute device 108 may determine that the duration of the line of sight will be short.

In block 430, if the expected or predicted duration of the line of sight for the currently-selected base station is longer than that of the current target base station, the method 400 proceeds to block 432, in which the compute device 108 designates the currently-selected base station at the target base station to connect to. If the expected or predicted duration of the line of sight for the currently-selected base station is not longer than that of the current target base station, the method 400 proceeds to block 434, in which the compute device 108 checks if there are any base stations left in the list. If there are, the method 400 loops back to block 422 to check the next base station. If there are not, the method 400 proceeds to block 436 in FIG. 6.

Figure 6:
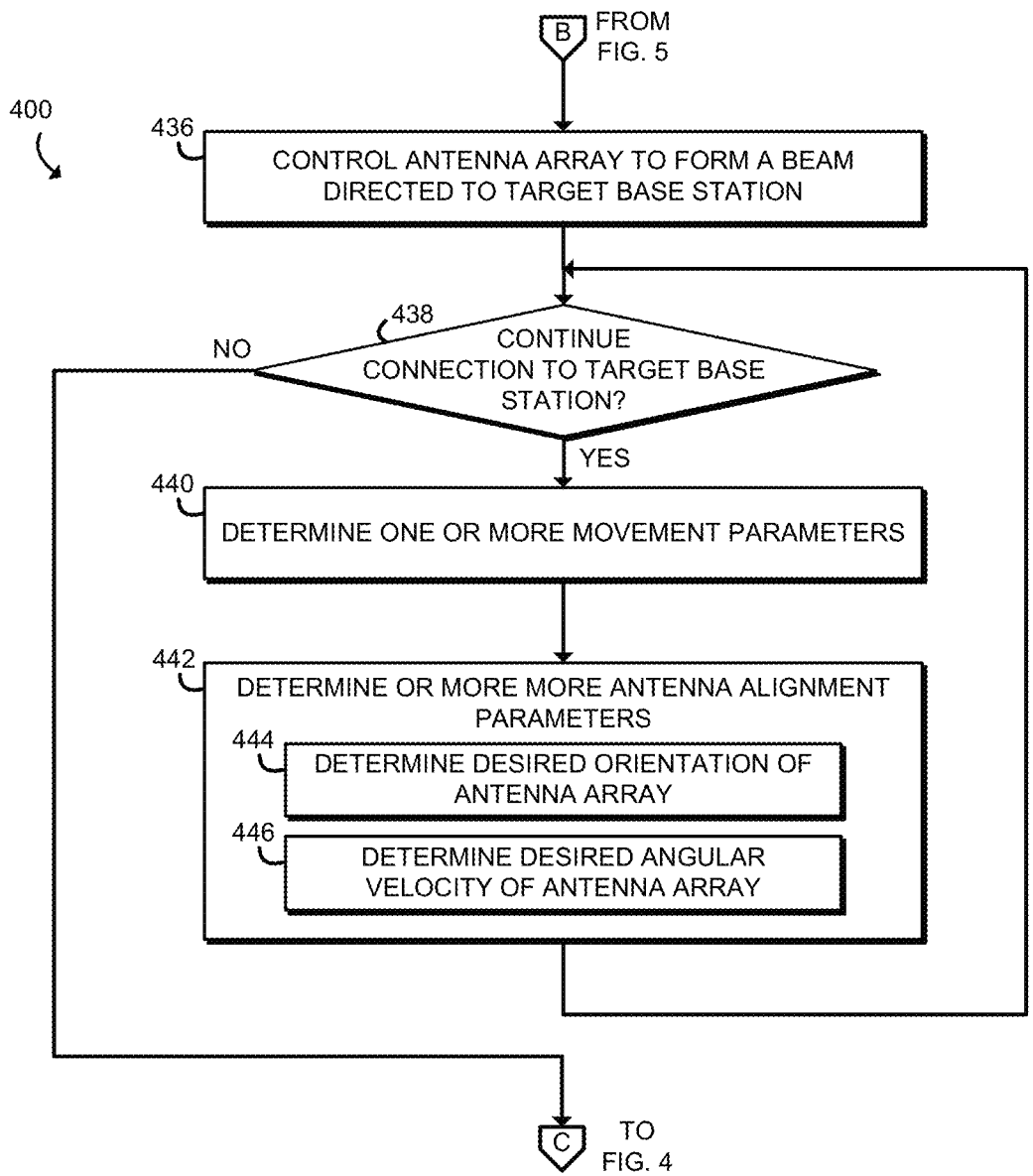

Referring now to FIG. 6, in block 436, the compute device 108 controls the antenna array 104 to form a beam directed to the target base station. The compute device 108 may control the phases of individual antennae of the antenna array 104 to form the beam. The compute device 108 may also control the phases of signals received from individual antennae of the antenna array 104 to receive a beam from a particular direction.

In block 438, the compute device 108 determines whether the compute device 108 should continue its connection to the target base station. If not, such as when the signal is very low and a better option is available, the compute device 108 loops back to block 416 in FIG. 4. If the compute device 108 should continue its connection to the target base station, the method 400 proceeds to block 440, in which the compute device 108 determines one or more movement parameters. The compute device 108 may determine one or more movement parameters in a similar manner as described in block 404, which will not be repeated in the interest of clarity.

In block 442, the compute device 108 determines one or more antenna alignment parameters based on the one or more movement parameters. The one or more antenna alignment parameters may indicate any factor related to alignment of the antenna array 104 to the target base station, such as an absolute orientation of the target base station relative to the compute device 108 and/or the vehicle 100, a relative orientation of the target base station relative to the compute device 108 and/or the vehicle 100, a desired angular velocity of the antenna array 104, etc. As part of determining the one or more antenna alignment parameters, the compute device 108 may determine a desired orientation of the antenna array 104 in block 444 and/or determine the desired angular velocity of the antenna array 104 in block 446.

Figure 7:
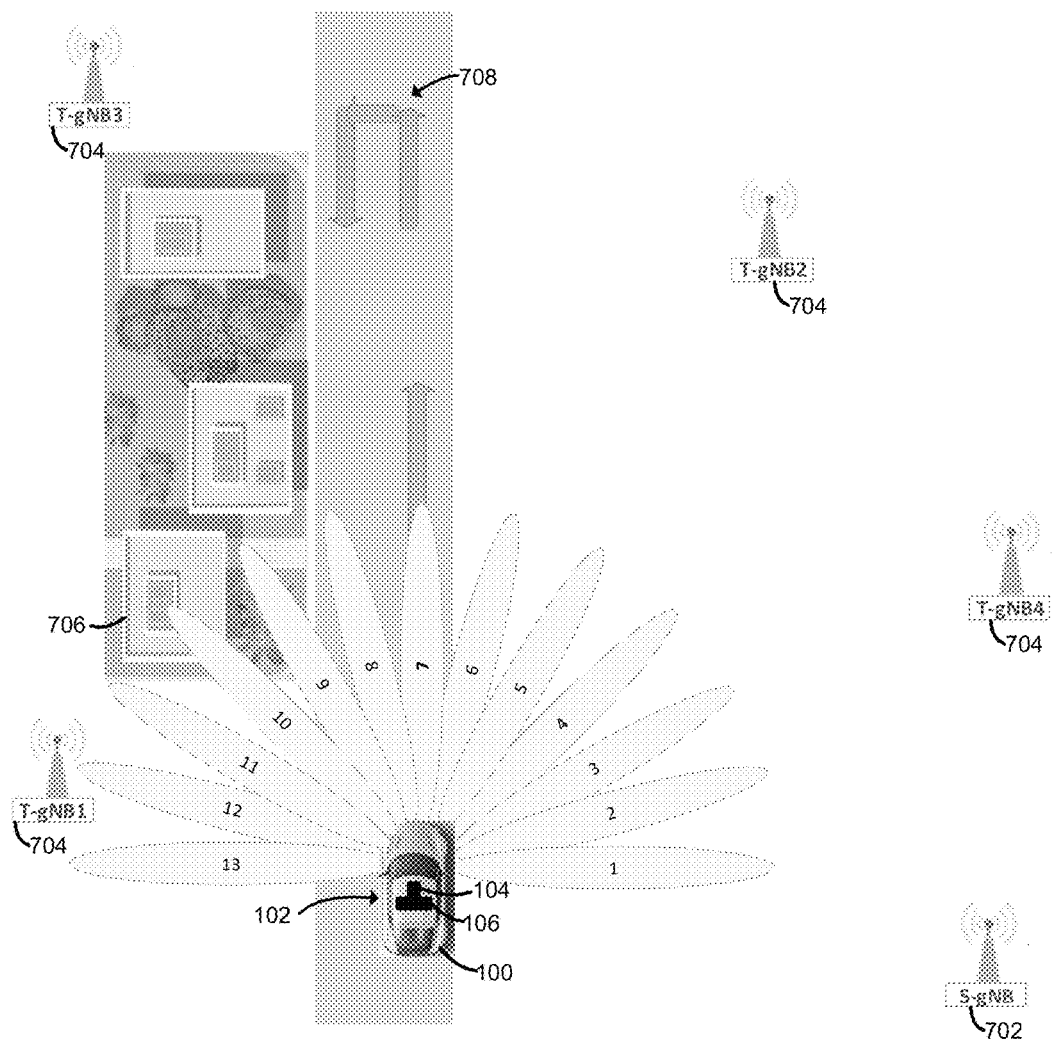
FIG. 7 is a simplified diagram of at least one embodiment of the vehicle of FIG. 1 in use.

Referring now to FIG. 7, a simplified diagram shows at least one embodiment of the vehicle 100 in use. The vehicle 100 includes a compute device 108 (not shown) and an antenna array 104, which can generate multiple beams, labeled with numbers 1 through 13. The antenna array 104 may be initially connected to a selected base station or gNodeB (S-gNB) 702. When changing to a new base station, antenna array 104 can be connected to any of several possible target base stations or gNodeBs (T-gNB) 704. In the illustrative embodiment, the compute device 108 may determine the expected duration of a line of sight to each T-gNB4 704. For example, the compute device 108 may know that the building 706 will cut off a line of sight to T-gNB1. The compute device 108 may know the position of the building 706 (or the presence of an obstacle in the position) by any suitable means, such as by image processing an image from the camera 218 or from past device movement data. Even if T-gNB1 704 has a high signal strength, the antenna array 104 may connect a base station such as T-gNB2 704 that has a longer expected duration of line of sight.

After the compute device 108 connects to the next base station, such as T-gNB2 704, the vehicle 100 may continue down the road. The vehicle 100 may then make a turn, such as a U-turn 708 as shown in FIG. 7. The compute device 108 may predict or detect this turn, such as by acquiring navigation data instructing or indicating such a turn or by measuring sensor data from an accelerometer. During the turn, the compute device 108 may control the physical orientation of the antenna array 104 to point towards the selected base station.

It should be appreciated that, although some of the embodiments described above were directed to an antenna array 104 in a vehicle 100, some or all the techniques described above may be used in other embodiments as well. For example, the compute device 108 may be embodied as a cell phone, and the compute device 108 may control the phases of an antenna array 104 to compensate for motion of the compute device 108 detected by an accelerometer 216.

EXAMPLES

Illustrative examples of the devices, systems, and methods disclosed herein are provided below. An embodiment of the devices, systems, and methods may include any one or more, and any combination of, the examples described below.

Example 1 includes a compute device for alignment of an antenna array of a vehicle, the compute device comprising an antenna controller to determine a target base station; control the antenna array of the vehicle to form a beam directed at the target base station; and device motion determination circuitry to determine one or more movement parameters of the vehicle; and determine, based on the one or more movement parameters of the vehicle, one or more antenna alignment parameters, wherein the antenna controller is further to control, based on the one or more antenna alignment parameters, a physical orientation of the antenna array of the vehicle so that the beam formed by the antenna array stays directed at the target base station during movement of the vehicle.

Example 2 includes the subject matter of Example 1, and wherein to determine the one or more movement parameters of the vehicle comprises to determine a turn movement parameter indicative of a turn of the vehicle of at least 45°, wherein to determine the one or more antenna alignment parameters comprises to determine the one or more antenna alignment parameters based on the turn movement parameter, and wherein to control the physical orientation of the antenna array of the vehicle comprises to control the physical orientation of the antenna array of the vehicle so that the beam formed by the antenna array stays directed at the target base station during the turn of the vehicle of at least 45°.

Example 3 includes the subject matter of any of Examples 1 and 2, and wherein to determine a turn movement parameter indicative of a turn of the vehicle of at least 45° comprises to predict that the vehicle will perform a turn of at least 45° at a particular time or place.

Example 4 includes the subject matter of any of Examples 1-3, and wherein to predict that the vehicle will perform a turn of at least 45° at a particular time or place comprises to predict, based on navigation information of the vehicle, that the vehicle will perform a turn of at least 45° at a particular time or place.

Example 5 includes the subject matter of any of Examples 1-4, and wherein to determine a turn movement parameter indicative of a turn of the vehicle of at least 45° comprises to determine sensor data from an accelerometer; and determine, based on the sensor data from the accelerometer, a turn movement parameter indicative of a present turn of the vehicle of at least 45°.

Example 6 includes the subject matter of any of Examples 1-5, and wherein to determine the target base station comprises to acquire a list comprising a plurality of base stations; determine, for each of the plurality of base stations, an expected duration of a line of sight from the antenna array to the corresponding base station; and select the target base station based on the expected duration of the line of sight from the antenna array to the target base station.

Example 7 includes the subject matter of any of Examples 1-6, and wherein the antenna controller is further to determine a threshold signal strength; and determine, for each of the plurality of base stations, a signal strength corresponding to the base station, wherein to select the target base station comprises to select the base station with the longest duration from the group of base stations of the plurality of base stations that have a signal strength that is at least the threshold signal strength.

Example 8 includes the subject matter of any of Examples 1-7, and wherein the device motion determination circuitry is further to acquire past device movement data, wherein to determine the one or more antenna alignment parameters comprises to determine the one or more antenna alignment parameters based on the past device movement data.

Example 9 includes the subject matter of any of Examples 1-8, and wherein the past device movement data comprises data indicative of past antenna alignment parameters, and wherein to determine the one or more antenna alignment parameters comprises to determine the one or more antenna alignment parameters based on the past antenna alignment parameters.

Example 10 includes a method for alignment of an antenna array of a vehicle by a compute device, the method comprising determining, by the compute device, a target base station; controlling, by the compute device, the antenna array of the vehicle to form a beam directed at the target base station; determining, by the compute device, one or more movement parameters of the vehicle; determining, by the compute device and based on the one or more movement parameters of the vehicle, one or more antenna alignment parameters; and controlling, by the compute device and based on the one or more antenna alignment parameters, a physical orientation of the antenna array of the vehicle so that the beam formed by the antenna array stays directed at the target base station during movement of the vehicle.

Example 11 includes the subject matter of Example 10, and wherein determining the one or more movement parameters of the vehicle comprises determining a turn movement parameter indicative of a turn of the vehicle of at least 45°, wherein determining the one or more antenna alignment parameters comprises determining the one or more antenna alignment parameters based on the turn movement parameter, and wherein controlling the physical orientation of the antenna array of the vehicle comprises controlling the physical orientation of the antenna array of the vehicle so that the beam formed by the antenna array stays directed at the target base station during the turn of the vehicle of at least 45°.

Example 12 includes the subject matter of any of Examples 10 and 11, and wherein determining a turn movement parameter indicative of a turn of the vehicle of at least 45° comprises predicting that the vehicle will perform a turn of at least 45° at a particular time or place.

Example 13 includes the subject matter of any of Examples 10-12, and wherein predicting that the vehicle will perform a turn of at least 45° at a particular time or place comprises predicting, based on navigation information of the vehicle, that the vehicle will perform a turn of at least 45° at a particular time or place.

Example 14 includes the subject matter of any of Examples 10-13, and wherein determining a turn movement parameter indicative of a turn of the vehicle of at least 45° comprises determining, by the compute device, sensor data from an accelerometer; and determining, based on the sensor data from the accelerometer, a turn movement parameter indicative of a present turn of the vehicle of at least 45°.

Example 15 includes the subject matter of any of Examples 10-14, and wherein determining the target base station comprises acquiring, by the compute device, a list comprising a plurality of base stations; determining, by the compute device and for each of the plurality of base stations, an expected duration of a line of sight from the antenna array to the corresponding base station; and selecting, by the compute device, the target base station based on the expected duration of the line of sight from the antenna array to the target base station.

Example 16 includes the subject matter of any of Examples 10-15, and further including determining, by the compute device, a threshold signal strength; and determining, by the compute device and for each of the plurality of base stations, a signal strength corresponding to the base station, wherein selecting the target base station comprises selecting the base station with the longest duration from the group of base stations of the plurality of base stations that have a signal strength that is at least the threshold signal strength.

Example 17 includes the subject matter of any of Examples 10-16, and further including acquiring past device movement data, wherein determining the one or more antenna alignment parameters comprises determining the one or more antenna alignment parameters based on the past device movement data.

Example 18 includes one or more computer-readable media comprising a plurality of instructions stored thereon that, when executed, causes a compute device of a vehicle to determine a target base station; control an antenna array of the vehicle to form a beam directed at the target base station; determine one or more movement parameters of the vehicle; determine, based on the one or more movement parameters of the vehicle, one or more antenna alignment parameters; and control, based on the one or more antenna alignment parameters, a physical orientation of the antenna array of the vehicle so that the beam formed by the antenna array stays directed at the target base station during movement of the vehicle.

Example 19 includes the subject matter of Example 18, and wherein to determine the one or more movement parameters of the vehicle comprises to determine a turn movement parameter indicative of a turn of the vehicle of at least 45°, wherein to determine the one or more antenna alignment parameters comprises to determine the one or more antenna alignment parameters based on the turn movement parameter, and wherein to control the physical orientation of the antenna array of the vehicle comprises to control the physical orientation of the antenna array of the vehicle so that the beam formed by the antenna array stays directed at the target base station during the turn of the vehicle of at least 45°.

Example 20 includes the subject matter of any of Examples 18 and 19, and wherein to determine a turn movement parameter indicative of a turn of the vehicle of at least 45° comprises to predict that the vehicle will perform a turn of at least 45° at a particular time or place.

Example 21 includes the subject matter of any of Examples 18-20, and wherein to predict that the vehicle will perform a turn of at least 45° at a particular time or place comprises to predict, based on navigation information of the vehicle, that the vehicle will perform a turn of at least 45° at a particular time or place.

Example 22 includes the subject matter of any of Examples 18-21, and wherein to determine a turn movement parameter indicative of a turn of the vehicle of at least 45° comprises to determine sensor data from an accelerometer; and determine, based on the sensor data from the accelerometer, a turn movement parameter indicative of a present turn of the vehicle of at least 45°.

Example 23 includes the subject matter of any of Examples 18-22, and wherein to determine the target base station comprises to acquire a list comprising a plurality of base stations; determine, for each of the plurality of base stations, an expected duration of a line of sight from the antenna array to the corresponding base station; and select the target base station based on the expected duration of the line of sight from the antenna array to the target base station.

Example 24 includes the subject matter of any of Examples 18-23, and wherein the plurality of instructions further cause the compute device to determine a threshold signal strength; and determine, for each of the plurality of base stations, a signal strength corresponding to the base station, wherein to select the target base station comprises to select the base station with the longest duration from the group of base stations of the plurality of base stations that have a signal strength that is at least the threshold signal strength.

Example 25 includes the subject matter of any of Examples 18-24, and wherein the plurality of instructions further cause the compute device to acquire past device movement data, wherein to determine the one or more antenna alignment parameters comprises to determine the one or more antenna alignment parameters based on the past device movement data.

The invention claimed is:

1. A compute device for alignment of an antenna array of a ground vehicle, the compute device comprising:
   an antenna controller to:
      acquire a list comprising a plurality of base stations;
      determine, for each of the plurality of base stations, an expected duration of a line of sight from the antenna array to the corresponding base station;
      select a target base station based on the expected duration of the line of sight from the antenna array to the target base station;
      control the antenna array of the vehicle to form a beam directed at the target base station; and
   device motion determination circuitry to:
      determine one or more movement parameters of the vehicle; and
      determine, based on the one or more movement parameters of the vehicle, one or more antenna alignment parameters,
   wherein the antenna controller is further to control, based on the one or more antenna alignment parameters, a physical orientation of the antenna array of the vehicle so that the beam formed by the antenna array stays directed at the target base station during movement of the vehicle.

2. The compute device of claim 1, wherein to determine the one or more movement parameters of the vehicle comprises to determine a turn movement parameter indicative of a turn of the vehicle of at least 45°,
   wherein to determine the one or more antenna alignment parameters comprises to determine the one or more antenna alignment parameters based on the turn movement parameter, and
   wherein to control the physical orientation of the antenna array of the vehicle comprises to control the physical orientation of the antenna array of the vehicle so that the beam formed by the antenna array stays directed at the target base station during the turn of the vehicle of at least 45°.

3. The compute device of claim 2, wherein to determine a turn movement parameter indicative of a turn of the vehicle of at least 45° comprises to predict that the vehicle will perform a turn of at least 45° at a particular time or place.

4. The compute device of claim 3, wherein to predict that the vehicle will perform a turn of at least 45° at a particular time or place comprises to predict, based on navigation information of the vehicle, that the vehicle will perform a turn of at least 45° at a particular time or place.

5. The compute device of claim 2, wherein to determine a turn movement parameter indicative of a turn of the vehicle of at least 45° comprises to:
   determine sensor data from an accelerometer; and
   determine, based on the sensor data from the accelerometer, a turn movement parameter indicative of a present turn of the vehicle of at least 45°.

6. The compute device of claim 1, wherein the antenna controller is further to:
   determine a threshold signal strength; and
   determine, for each of the plurality of base stations, a signal strength corresponding to the base station,
   wherein to select the target base station comprises to select the base station with the longest duration from the group of base stations of the plurality of base stations that have a signal strength that is at least the threshold signal strength.

7. The compute device of claim 1, wherein the device motion determination circuitry is further to acquire past device movement data of additional vehicles different from the vehicle,
   wherein to determine the one or more antenna alignment parameters comprises to determine the one or more antenna alignment parameters based on the past device movement data of additional vehicles different from the vehicle.

8. The compute device of claim 7, wherein the past device movement data comprises data indicative of past antenna alignment parameters of additional vehicles different from the vehicle, and wherein to determine the one or more antenna alignment parameters comprises to determine the one or more antenna alignment parameters based on the past antenna alignment parameters of additional vehicles different from the vehicle.

9. The compute device of claim 1, wherein the device motion determination circuitry is further to:
   acquire a coverage map indicative of an area of line of sight availability for each of the plurality of base stations; and
   predict future movement of the vehicle, wherein to determine, for each of the plurality of base stations, the expected duration of the line of sight from the antenna array to the corresponding base station comprises to determine, for each of the plurality of base stations, the expected duration of the line of sight from the antenna array to the corresponding base station based on the coverage map and the predicted future movement of the vehicle.

10. The compute device of claim 9, wherein the coverage map indicative of the area of line of sight availability for each of the plurality of base stations comprises an indication of one or more reflection locations that provide an indirect line of sight for at least one of the plurality of base stations,
wherein to determine, for each of the plurality of base stations, the expected duration of the line of sight from the antenna array to the corresponding base station based on the coverage map and the predicted future movement of the vehicle comprises to determine, for each of the plurality of base stations, the expected duration of the line of sight from the antenna array to the corresponding base station based on the indication of the one or more reflection locations that provide an indirect line of sight for the at least one of the plurality of base stations.

11. The compute device of claim 9, wherein to acquire the coverage map comprises to acquire, from each of the plurality of base stations, a base station coverage map indicative of an area of line of sight availability for the corresponding base station, wherein each of the base station coverage maps are maintained by the corresponding base station.

12. The compute device of claim 1, wherein the device motion determination circuitry is further to:
capture one or more images from a camera, wherein the vehicle comprises the camera;
perform image processing on the one or more images to identify one or more objects in the one or more images; and
determine whether the identified one or more objects will block a line of sight from one or more of the plurality of base stations to the antenna array,
wherein to determine, for each of the plurality of base stations, the expected duration of the line of sight from the antenna array to the corresponding base station comprises to determine, for each of the plurality of base stations, the expected duration of the line of sight from the antenna array to the corresponding base station based on a determination that the identified one or more objects will block a line of sight from the one or more of the plurality of base stations to the antenna array.

13. A method for alignment of an antenna array of a vehicle by a compute device, the method comprising:
acquiring, by the compute device, a list comprising a plurality of base stations;
determining, by the compute device and for each of the plurality of base stations, an expected duration of a line of sight from the antenna array to the corresponding base station;
selecting, by the compute device, a target base station based on the expected duration of the line of sight from the antenna array to the target base station;
controlling, by the compute device, the antenna array of the vehicle to form a beam directed at the target base station;
determining, by the compute device, one or more movement parameters of the vehicle;

determining, by the compute device and based on the one or more movement parameters of the vehicle, one or more antenna alignment parameters; and
controlling, by the compute device and based on the one or more antenna alignment parameters, a physical orientation of the antenna array of the vehicle so that the beam formed by the antenna array stays directed at the target base station during movement of the vehicle.

14. The method of claim 13, wherein determining the one or more movement parameters of the vehicle comprises determining a turn movement parameter indicative of a turn of the vehicle of at least 45°,
wherein determining the one or more antenna alignment parameters comprises determining the one or more antenna alignment parameters based on the turn movement parameter, and
wherein controlling the physical orientation of the antenna array of the vehicle comprises controlling the physical orientation of the antenna array of the vehicle so that the beam formed by the antenna array stays directed at the target base station during the turn of the vehicle of at least 45°.

15. The method of claim 14, wherein determining a turn movement parameter indicative of a turn of the vehicle of at least 45° comprises predicting that the vehicle will perform a turn of at least 45° at a particular time or place.

16. The method of claim 15, wherein predicting that the vehicle will perform a turn of at least 45° at a particular time or place comprises predicting, based on navigation information of the vehicle, that the vehicle will perform a turn of at least 45° at a particular time or place.

17. The method of claim 13, further comprising:
determining, by the compute device, a threshold signal strength; and
determining, by the compute device and for each of the plurality of base stations, a signal strength corresponding to the base station,
wherein selecting the target base station comprises selecting the base station with the longest duration from the group of base stations of the plurality of base stations that have a signal strength that is at least the threshold signal strength.

18. The method of claim 13, further comprising acquiring past device movement data indicative of past trips of the vehicle, wherein determining the one or more antenna alignment parameters comprises determining the one or more antenna alignment parameters based on the past device movement data indicative of past trips of the vehicle.

19. One or more non-transitory computer-readable media comprising a plurality of instructions stored thereon that, when executed, causes a compute device of a vehicle to:
acquire a list comprising a plurality of base stations;
determine, for each of the plurality of base stations, an expected duration of a line of sight from an antenna array of the vehicle to the corresponding base station;
select the target base station based on the expected duration of the line of sight from the antenna array to the target base station;
control the antenna array of the vehicle to form a beam directed at the target base station;
determine one or more movement parameters of the vehicle;
determine, based on the one or more movement parameters of the vehicle, one or more antenna alignment parameters; and
control, based on the one or more antenna alignment parameters, a physical orientation of the antenna array of the vehicle so that the beam formed by the antenna array stays directed at the target base station during movement of the vehicle.

20. The one or more non-transitory computer-readable media of claim 19, wherein to determine the one or more movement parameters of the vehicle comprises to determine a turn movement parameter indicative of a turn of the vehicle of at least 45°,
wherein to determine the one or more antenna alignment parameters comprises to determine the one or more antenna alignment parameters based on the turn movement parameter, and
wherein to control the physical orientation of the antenna array of the vehicle comprises to control the physical orientation of the antenna array of the vehicle so that the beam formed by the antenna array stays directed at the target base station during the turn of the vehicle of at least 45°.

21. The one or more non-transitory computer-readable media of claim 20, wherein to determine a turn movement parameter indicative of a turn of the vehicle of at least 45° comprises to predict that the vehicle will perform a turn of at least 45° at a particular time or place.

22. The one or more non-transitory computer-readable media of claim 21, wherein to predict that the vehicle will perform a turn of at least 45° at a particular time or place comprises to predict, based on navigation information of the vehicle, that the vehicle will perform a turn of at least 45° at a particular time or place.

23. The one or more non-transitory computer-readable media of claim 20, wherein to determine a turn movement parameter indicative of a turn of the vehicle of at least 45° comprises to:
determine sensor data from an accelerometer; and
determine, based on the sensor data from the accelerometer, a turn movement parameter indicative of a present turn of the vehicle of at least 45°.

24. The one or more non-transitory computer-readable media of claim 19, wherein the plurality of instructions further cause the compute device to:
determine a threshold signal strength; and
determine, for each of the plurality of base stations, a signal strength corresponding to the base station,
wherein to select the target base station comprises to select the base station with the longest duration from the group of base stations of the plurality of base stations that have a signal strength that is at least the threshold signal strength.

25. The one or more non-transitory computer-readable media of claim 19, wherein the plurality of instructions further cause the compute device to acquire past device movement data,
wherein to determine the one or more antenna alignment parameters comprises to determine the one or more antenna alignment parameters based on the past device movement data.

* * * * *